United States Patent [19]

Albright et al.

[11] Patent Number: 4,727,480

[45] Date of Patent: Feb. 23, 1988

[54] EMULATION OF A DATA PROCESSING SYSTEM

[75] Inventors: Loren O. Albright, Derry; David J. Angel, Hudson; Patrick Klos; James P. Moskun, both of Nashua, all of N.H.; Carol W. Tyler, Groton, Mass.

[73] Assignee: Wang Laboratories, Inc., Lowell, Mass.

[21] Appl. No.: 629,028

[22] Filed: Jul. 9, 1984

[51] Int. Cl.[4] .............................................. G06F 9/00
[52] U.S. Cl. ................................................... 364/200
[58] Field of Search .............................. 364/200, 900

[56] References Cited

U.S. PATENT DOCUMENTS 4,370,709  1/1983  Fosdick ............................... 364/200
4,377,852  3/1983  Thompson ........................... 364/900

OTHER PUBLICATIONS

The Wang Professional Computer Technical Reference Manual, First Edition, Apr. 1983, Wang Laboratories Inc., Lowell Mass.
IBM Technical Reference Manual for the IBM Personal Computer, Aug. 1981, IBM Corporation, Armonk, New York.

*Primary Examiner*—Gareth D. Shaw
*Assistant Examiner*—John G. Mills
*Attorney, Agent, or Firm*—Michael H. Shanahan; Scott K. Peterson

[57] ABSTRACT

Emulation method and apparatus allowing a first system, which is not designed as a functional duplicate of a second system, to emulate the second system. The input/output structure of the second system is emulated in the first system by means of routines stored therein and which direct the already existing input/output structure to operate in the same manner as the input/output structure of the second system. The emulation routines are in turn invoked through the non-maskable interrupt mechanism of the first system by a modification thereto which detects the occurrence of "foreign" input/output requests; that is, input/output requests occuring in programs originally written for the second system and which are not normally recognized by the first system. The means for detecting foreign input/output requests includes means for comparing input/output request port addresses to the range of port addresses occupied by the system input/output devices and indicating when a port address is within the range of address space occupied by the system input/output devices. The foreign request detection means generates a non-maskable interrupt to invoke an input/output emulation routine upon the occurrence of input/output requests which do not normally fall within the range of input/output ports supported by the first system.

11 Claims, 7 Drawing Figures

EMULATION OF A DATA PROCESSING SYSTEM

BACKGROUND OF THE INVENTION

1. Field Of The Invention

The present invention relates to an emulation of a first computer system by a second, substantially different such system and, in particular, in such a manner as to enable the second system to run, without modification, software programs developed for the first system.

2. Prior Art

A recurring problem in computer systems is that of software availability and, in particular, the availability of applications software, that is, programs which are run on or executed by systems in order to perform particular tasks for users. Examples of such applications programs include word and data processing, data bases, graphics and spread sheets and encompass the full range of tasks and functions which a user would wish to accomplish with such a system.

The potential range of applications for a particular system are such that it is extremely difficult for a single system manufacturer to develop more than a basic range of applications programs for its systems. The remainder, and often the majority of applications programs, are commonly developed and provided by companies specializing in the development of applications programs. For economic reasons, such applications program developers usually concentrate their available resources upon the more common computer systems. While applications program developers may wish to provide programs for the less common but still economically significant systems, their available resources may not allow the development of programs for a full range of different systems. As such, the range of applications programs for other than the few most common systems may be limited.

This problem has frequently been described as one of program "transportability", that is, the ability to "transport" a program from one system to a second, differing system without the need to rewrite or extensively modify the program. A partial solution to this problem which has been adopted by the computer industry, and in particular for the smaller "personal" or "professional" computers, is the development of standardized operating systems which are used on a wide range of internally different computers. In this regard, it should be noted that operating systems essentially supervise, direct and control the overall operation of a computer system upon which it is "run". In addition, an operating system provides an interface between an applications program being run upon a system and the actual internal structure of the system itself. Essentially, the applications program "runs on" and "sees" the operating system and not the actual underlying computer system structure. The adoption of such common, standard operating systems, such as CP/M and MS-DOS, which are run upon a number of internally differing systems thereby theoretically allowing the development of programs which will also run upon those systems without modifications. By way of example, both the Wang Laboratories Professional Computer and the IBM Personal Computer (PC) use essentially the same operating system, referred to as MS-DOS. An applications program developed for the IBM Personal Computer (PC) should therefore be theoretically able to run upon the Wang Professional Computer without modification, and the reverse.

In practice, such operating systems frequently do not provide the full range of features and functions desired by applications program developers, or do not provide adequate performance in programs which interface with a system only through the operating system. Because of this, many if not most applications programs are in fact written so as to interface, at least in part, directly with the internal structures of the systems on which they are to be run. Because the internal structures of computer systems provided by different manufacturers differ, often widely, even applications programs written primarily to run on one of the standard operating systems are often not in fact "transportable" from one system to another.

In addition, many manufacturers have modified the "standard" oprating systems for enhanced performance upon their particular systems. For example, as described above, both Wang Laboratories and IBM use the same basic standard MS-DOS operating system in their personal and professional computers. In each case, however, MS-DOS has been modified to enhance performance on the particular systems designed by Wang and IBM and are no longer completely "standard". Such modifications are usually dependent upon the particular internal structural features of the particular systems and are subsequently reflected in the applications programs written for the particular systems. Consequently, even applications programs which interface only with a "standard" operating system running on a particular system are often not transportable to another system which uses yet another modified version of that "standard" operating system.

One possible solution to these problems is for a manufacturer to essentially duplicate, without necessarily copying, the internal structures of a system to be emulated. This requires the development of both the hardware structure of the emulating system and the development of an operating system for the emulating system which essentially duplicates the functionality of the operating system of the system to be emulated. This approach may be undesirable, however, in that the system emulated may be obsolete or otherwise lacking or inferior in performance. Also, the emulating system and its operating system are essentially dedicated to a single purpose, that of emulating another system, rather than having broader utility.

Yet another possible solution to the above problems is the emulation of a particular system by means of software, that is, emulation programs, running upon a system which is to emulate that system. This approach may, however, prove undesirable because of the possibly extensive "overhead", that is, memory space and processor operation time, required for the emulation function.

SUMMARY OF THE INVENTION

The present invention allows a first system, which is not designed as a functional duplicate of a second system, to emulate the second system without incurring the hardware, software and operating penalties described above. In the present invention, the input/output structure of the second system is emulated in the first system by means of routines stored therein and which direct the already existing input/output structure to operating in the same manner as the input/output sructure of the second system. The emulation routines are in turn invoked through the non-maskable interrupt mechanism of the first system by a modification thereto which detects the occurrence of "foreign" input/output requests; that is, input/output requests occurring in programs originally written for the second system and whch are not normally recognized by the first system.

In a presently preferred embodiment of the present invention, the input/output structure of the first system includes input/output devices having ports occupying a first range of the system address space and the input/output devices of the second system have ports located within a second, differing range of address space. The means for detecting foreign input/output requests includes means for comparing input/output request port addresses to the range of port addresses occupied by the system input/output devices and indicating when a port address is within the range of address space occupied by the system input/output devices. The foreign request detection means then generates a non-maskable interrupt to invoke an input/output emulation routine upon the occurrence of input/output requests which do not normally fall within the range of input/output ports supported by the first system.

The emulation means of the present invention further includes means for "trapping", that is, storing, information pertaining to such foreign input/output requests as the time such requests are initiated. The trapped information is subsequently used by the emulation means in determining the particular input/output operation to be emulated. For example, if the request is for a write operation, the information to be written, which appears in association with the request, is similarly trapped to be subsequently written to the first system input/output port corresponding to the second system's port which was indicated by the request.

In a yet further embodiment of the present invention, the first system further includes means for emulating the hardware interrupt mechanism of the second system. In the hardware interrupt emulation mechanism of the present system, the first system's software interrupt service routines are provided with an additional group of hardware interrupt emulation routines which emulate the operation of the hardware interrupt mechanism of the second system. The first system's interrupt vector table correspondingly contains additional vectors to the emulation routines and the first system's hardware interrupt service routines are altered to include references to these vectors.

The emulation routines, vectors and modifications to the existing first system's hardware interrupt routines are enabled with the system is emulating the second system. The first system thereby emulates the hardware interrupt mechanism of the second system by performing hardware interrupt emulation operations in the same manner as software interrupt operations. It should be noted that the added interrupt mechanism emulation routines are not limited to purely emulation routines, but may further include or be replaced by other routines providing additional functionality or enhanced performance to the system.

Other advantages and features of the present invention will be understood by those of ordinary skill in the art after referring to the following detailed description of a preferred embodiment and drawings, wherein:

BRIEF DESCRIPTION OF THE DRAWINGS

FIG. 1 is split between two sheets; the figures labeled FIG. 1A and 1B are jointly referred to in the following discussion as FIG. 1;

FIG. 2 is split between two sheets; the figures labeled FIG. 2A and FIG. 2B are jointly referred to in the following discussion as FIG. 2;

FIG. 5A is slit between two sheets; the figures labeled FIG. 5A(A) and FIG. 5A(B) are jointly referred to in the following discussion as FIG. 5A.

DESCRIPTION OF A PREFERRED EMBODIMENT

The following will first describe the general structure and operation of the hardware and software of a typical computer system of the "pesonal" or "professional" computer class, for example, a Wang Laboratories, Inc. Professional Computer, as will be well understood by one of ordinary skill in the art. The structural and operational features by which a first such system differs from a second system; for example, an IBM Personal Computer (PC), and the effects of such differences with regard to the previously described "standard" operating systems and applications programs will then be described. Finally, the method and apparatus of the present invention by which a first such system is enabled to "run", without modification, programs originally written for a second such system, will be described.

1. Structure and Operation Of A "Personal" or "Professional" Class Computer

A. Basic Hardware Structure and Operation (FIGS. 1 and 2)

Figure 1:
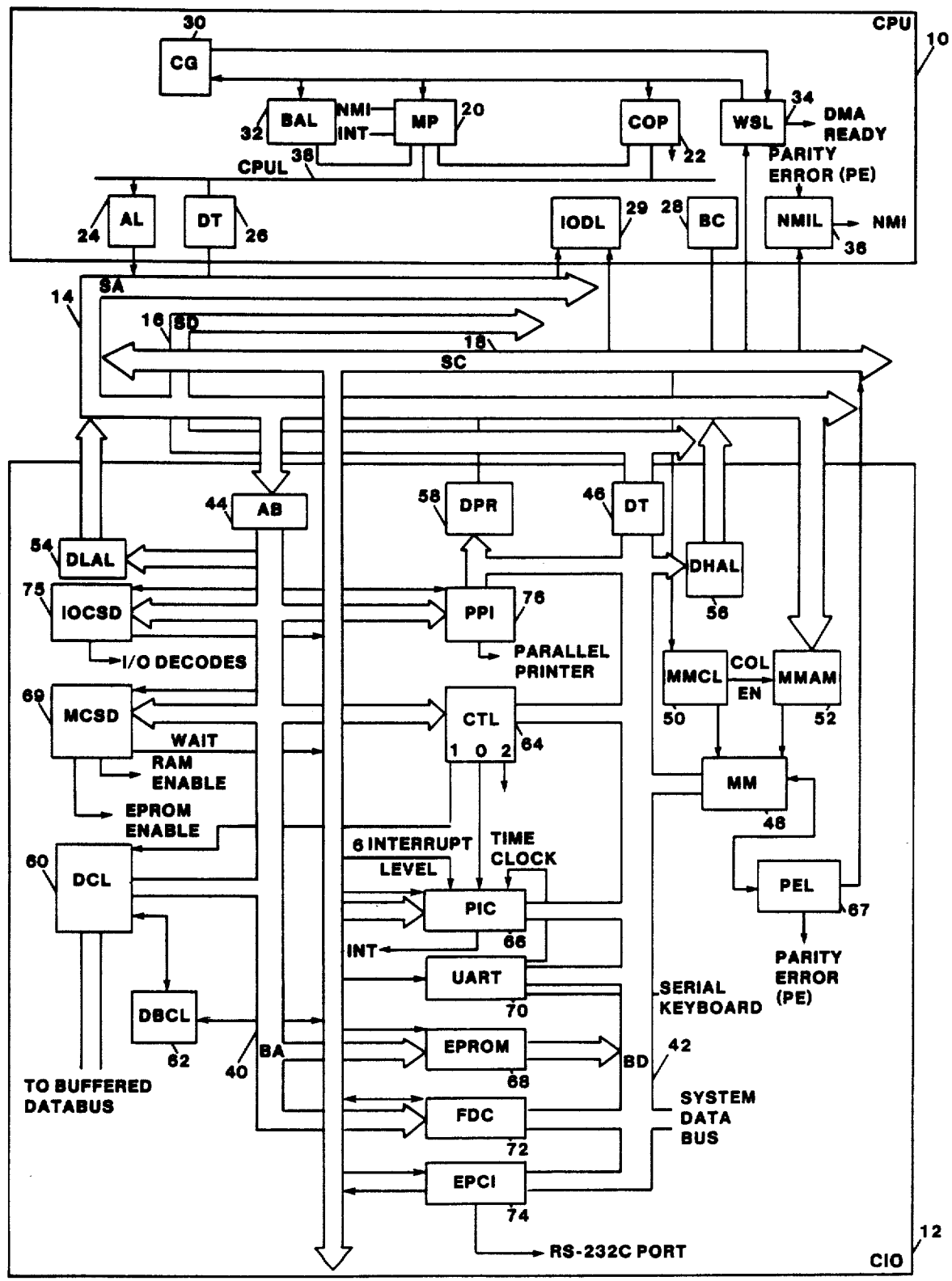
FIG. 1 is a block diagram of a computer system of the "personal" or "professional" class.
Figure 2:
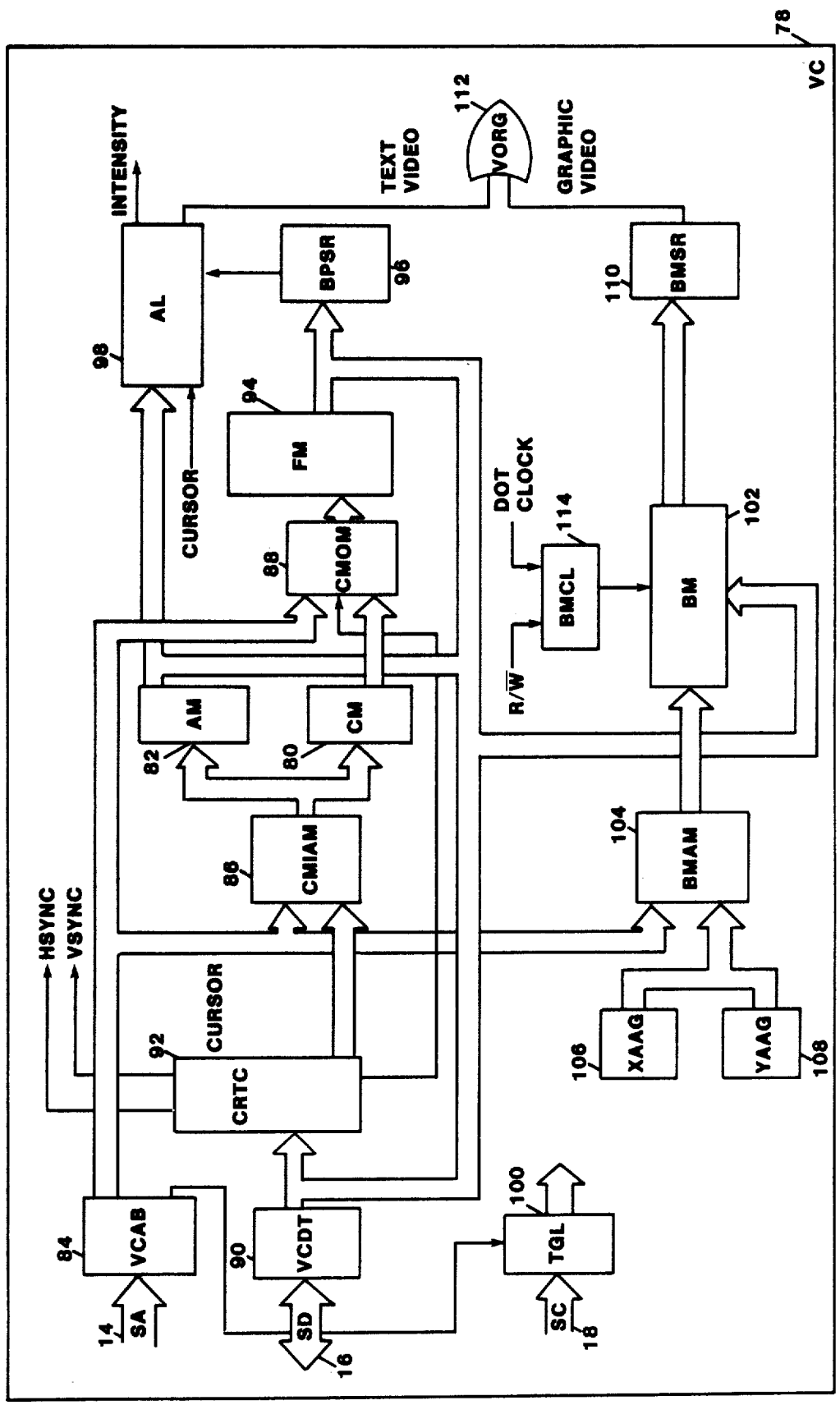
FIG. 2 is a block diagram of a video controller used in the system of FIG. 1.

Referring to FIG. 1, a block diagram of a "personal" or "professional" class computer system is shown, the example herein being a Wang Laboratories "Professional Computer". This system is typical and representative of the class of such systems and is described in, for example, "The Wang Professional Computer Technical Reference Manual" and other related publications available from Wang Laboratories, Inc. of Lowell, MA, which are incorporated herein by reference. The following description of the system of FIG. 1 will be brief in that the structure and operation of such systems is well understood by those of ordinary skill in the art, and that of the exemplary system presented herein is thoroughly described in the above referenced and incorporated publications.

As indicated in FIG. 1, the major elements of the system include Central Processing Unit (CPU) 10 and Control-Input/Output Logic (CIO) 12, which are interconnected through the bus structure comprising System Address (SA) bus 14, System Data (SD) bus 16 and System Control (SC) 18. As indicated by their designations, System Address (SA) bus 14 and System Data (SD) bus 16 respectively communicate addresses and data between the elements of the system while System Control (SC) bus 18 is essentially used to communicate system control information.

1. Central Processing Unit (FIG. 1).

Referring to Central Processing Unit (CPU) 10, arithmetic and logic operations, including major system control functions, are performed by Main Processor (MP) 20, assisted in arithmetic operations by Coprocessor (COP) 22. Main Processor (MP) 20 and Coprocessor (COP) 22 may respectively be, for example, an Intel 8086 microprocessor and an Intel 8087.

Main Processor (MP) 20 and Coprocessor (COP) 22 communicate addresses and data to, respectively, System Address (SA) bus 14 and System Data (SD) bus 16 through, respectively, Address Latch (AL) 24 and Data Transceivers (DT) 26 and memory and bus control information to System Control (SC) bus 18 through Bus Controller (BC) 28.

Associated with Bus Controller (BC) 28 is Input/Output Decode Logic (IODL) 29, which monitors addresses appearing on System Address (SA) bus 14 and input/output control information appearing on System Control (SC) bus 18. Input/Output Decode Logic (IODL) 29 detects the occurrence of system input/output requests and provides corresponding control signal outputs to System Control (SC) bus 18. The control outputs of Input/Output Decode Logic (IODL) 29 are in turn used by the system Input/Output (IO) devices, as described further below, in performing system Input/Output (IO) operations.

Associated with Main Processor (MP) 20 and Coprocessor (COP) 22 are a Clock Generator (CG) 30, which is the source of clock signals for the system, and Bus Acquisition Logic (BAL) 32, which controls Direct Memory Access (DMA) operations, that is, the direct transfer of data to and from the system main memory, described below. Also associated with Main Processor (MP) 20 and Coprocessor (COP) 22 is Wait State Logic (WSL) 34, which essentially monitors system operation and adjusts the time allowed to each so as to prevent conflicts in Central Processing Unit (CPU) 10 operations. Nonmaskable Interrupt Logic 36 controls a portion of the operation of the system's interrupt mechanism, which is described in further detail below.

Finally, the various elements of Central Processing Unit (CPU) 10 desribed above are interconnected and communicate through Central Processing Unit Local (CPUL) bus 38.

2. Control and Input/Output (I/O) Unit (FIG. 1)

Referring to Control Input/Output Logic (CIO) 12, the elements of Control Input/Output Logic (CIO) 12 are, as shown in FIG. 1, interconnected primarily through Buffered Address (BA) bus 40 and Buffered Data (BD) bus 42 and through System Control (SC) bus 18. Buffered Address (BA) bus 40 is, as shown, connected from System Address (SA) bus 14 through Address Buffer (AB) 44 while Buffered Data (BD) bus 42 is interconnected with System Data (SD) bus 16 through Data Transceivers (DT) 46.

Control Input/Output Logic (CIO) 12 includes Main Memory (MM) 48, which stores and provides data to be operated upon by the system and the programs which control the operation of the system, such as the operating system and applications programs. Associated with Main Memory (MM) 48 are Main Memory Control Logic (MMCL) 50 and Main Memory Address Multiplexer (MMAM) 52, which are respectively connected from System Control (SC) bus 18 and System Address (SA) bus 14 and provide, respectively, control and address inputs to Main Memory (MM) 48. The data input/output of Main Memory (MM) 48 is interconnected with Buffered Data (BD) bus 42.

Connected respectively from Buffered Address (BA) bus 40 and Buffered Data (BD) bus 42 are Direct Memory Access Low Address Latch (DLAL) 54 and Direct Memory Access High Address Latch (DHAL) 56. Direct Memory Access Low Address Latch (DLAL) 54 and Direct Memory Access High Address Latch (DHAL) 56 are a part of the system's Direct Memory Access (DMA) mechanism and provide respectively the low and high order portions of Direct Memory Access (DMA) addresses to Main Memory (MM) 48 through System Address (SA) bus 14 and Main Memory Address Multiplexer (MMAM) 52 during Direct Memory Access (DMA) operations. Associated with Direct Memory Access Low Address Latch (DLAL) 54 and Direct Memory Access High Address Latch (DHAL) 56 is Direct Memory Access Page Register (DPR) 58, which is connected from Buffered Address (BA) bus 40 and similarly provides a portion of Direct Memory Access (DMA) addresses to Main Memory (MM) 48 through System Address (SA) bus 14 and Main Memory Address Multiplexer (MMAM) 52 during Direct Memory Access (DMA) operations, in this case the portion of the address identifying the memory page involved in the Direct Memory Access (DMA) operation. The primary control of Direct Memory Access (DMA) operations is provided by Direct Memory Access Control Logic (DCL) 60 and Direct Memory Access Bus Control Logic (DBCL) 62, which are connected from Buffered Address (BA) bus 40 and provide data outputs to Buffered Data (BD) bus 42 and control outputs to other portions of the system.

The system control logic included in Control Input/Output Logic (CIO) 12 includes Counter and Timer Logic (CTL) 64 and Programmable Interrupt Controller (PIC) 66, which may comprise, respectively, an Intel 8253 and an Intel 8259A. Counter and Timer Logic (CL) 64 essentially controls the timing of all major system operations while Programmable Interrupt Controller (PIC) 66, in conjunction with Nonmaskable Interrupt Logic (NMIL) 36, comprises the system interrupt control logic, which will be described further below. Associated with Main Memory (MM) 48 and the system interrupt control logic is Parity Error Logic (PEL) 67, which monitors data written into and read from Main Memory (MM) 48 and provides a parity, or data, error signal to the interrupt control logic when such an error occurs.

The system program and control logic further includes Erasable-Programmable Read-Only-Memory (EPROM) 68, which stores and provides programs used to load the system operating system and application programs from, for example, discs mounted in external disc drives into Main Memory (MM) 48. The programs stored in Erasable-Programmable Read-Only-Memory (EPROM) 68 essentially comprise permanently resident programs which are used to initialize the operation of the system. The system program and control logic further includes Memory Control Store Decode (MCSD) 69, which operates in conjunction with Erasable-Programmable Read Only Memory (EPROM) 68 to select whether current system control is to be provided from Erasable-Programmable Read Only Memory (EPROM) 6, at system initialization, or from programs stored in Main Memory (MM) 48, during normal operation.

Control Input/Output Logic (CIO) 12 further includes a number of elements for communicating between the system and external devices, such as a keyboard, disc drives and printers. Included in these elements is Universal Asynchronous Receiver/Transmitter (UART) 70, which provides a serial interface with a keyboard and Floppy Disc Controller (FDC) 72, which provides an interface to a disc drive. Further included are an Extended Programmable Communications Interface (EPCI) 74; for example, an Intel 2661, which provides a programmable RS-232 Input/Output (IO) port, and Parallel Printer Interface (PPI) 76, for example, an Intel 8255A, which provides a parallel interface to various printers. Other input/output elements may include interface elements to, for example, Winchester hard disc drives and various remote telecommunications interfaces.

Finally, Control Input/Output Logic (CIO) 12 includes Input/Output Control Store Decode (IOCSD) 75, which essentially stores and provides sequences of instructions; that is, routines, for controlling the input/operations of the system and, in particular, the operations of the Input/Output (IO) devices described above.

3. Video Controller Unit (FIG. 2)

The system includes two primary user interfaces: the first, described above, is through a keyboard connected from Universal Asynchronous Receiver/Transmitter (UART) 70 and the second is a Cathode Ray Tube (CRT) display. Referring to FIG. 2, a Video Controller 78 providing the interface between the system and a Cathode Ray Tube (CRT) is shown. While the system described herein has available a plurality of such video controllers for various displays, Video Controller (VC) 78 is typical of this class of Cathode Ray Tube (CRT) interface elements and provides both a character set graphic display and a bit mapped display.

Referring first to the character set portion of Video Controller (VC) 78, Video Controller (VC) 78 includes a Character Memory 80 for storing and providing ASCII type codes identifying alphanumeric characters, graphic symbols and associated textual symbols to be displayed on the Cathode Ray Tube (CRT) screen. These codes are stored in Character Memory (CM) 80 in locations corresponding to the locations in which they are to appear on the display. Associated with Character Memory (CM) 80 is Attribute Memory (AM) 82, which stores and provides, for each character code stored in Character Memory (CM) 80, corresponding attribute codes identifying whether the corresponding character or symbol is to be, for example, highlighted, underlined, and so on.

Information is written into Character Memory (CM) 80 and Attribute Memory (AM) 82 from System Data (SD) bus 16 at addresses provided from System Address (SA) bus 14 and under control of control inputs provided from System Control (SC) bus 18. For these purposes, Video Controller (VC) 78 includes a Video Controller Address Buffer (VCAB) 84 connected from System Address (SA) bus 14 and which provides corresponding address inputs to Character/Address Memory Input Address Multiplexer (CMIAM) 86. Character/Attribute Memory Input Address Multiplexer (CMIAM) 86 in turn provides address inputs to Character Memory (CM) 80 and Attribute Memory (AM) 82. As indicated in FIG. 2, Video Controller Address Buffer (VCAB) 84 also provides address inputs to Character/Address Memory Output Multiplexer (CMOM) 88 which, as described further below, controls the reading of character and attributes codes from Character Memory (CM) 80 and Attribute Memory (AM) 82 to the logic driving the Cathode Ray Tube (CRT) display. Video Controller (VC) 78 further includes a Video Controller Data Transceiver (VCDT) 90 interconnected with System Data (SD) bus 16 and which is used in part to write character and attribute codes into Character Memory (CM) 80 and Attribute Memory (AM) 82. As shown in FIG. 2, Video Controller Data Transceiver (VCDT) 90 is also provided with an output to Cathode Ray Tube Controller (CRTC) 92, which in turn provides control signals to the Cathode Ray Tube (CRT) drive circuits, and an input from Font Memory (FM) 94, described further below, which allows the contents of Font Memory (FM) 94 to be read onto System Data (SD) bus 16.

Font Memory (FM) 94 is used to store bit patterns corresponding to the various character and symbol codes which may be represented on the Cathode Ray Tube (CRT) display. The codes stored in Character Memory (CM) 80 and representing characters and symbols to be displayed on the Cathode Ray Tube (CRT) are read from Character Memory (CM) 80 under control of addresses provided through Character/Attribute Memory Input Address Multiplexer (CMIAM) 86 from Cathode Ray Tube Controller (CRTC) 92 and are provided as address inputs to Font Memory (FM) 94. Font Memory (FM) 94 in turn responds to these inputs by providing the corresponding bit patterns as an output to Bit Pattern Shift Register (BPSR) 96 which in turn performs a parallel to serial conversion and provides the resulting serial bit patterns to Attribute Logic (AL) 98.

Attribute Logic (AL) 98, as shown in FIG. 2, includes a further input from the output of Attribute Memory (AM) 82. The attribute codes corresponding to the character/symbols codes stored in Character Memory (CM) 80 are read from Attribute Memory (AM) 82 in parallel with the corresponding codes read from Character Memory (CM) 80 and are used by Attribute Logic (AL) 98 to appropriately modify the bit patterns provided from Bit Pattern Shift Register (BPSR) 96 in such a manner as to provide the corresponding characters/symbols with their corresponding attributes. The output of Attribute Logic (AL) 98 is provided as a text video output to the Cathode Ray Tube (CRT) driver circuits to result in a corresponding display on the Cathode Ray Tube (CRT) screen.

Finally, Video Controller (VC) 78 includes Timing Generator Logic (TGL) 100, which is connected from System Control (SC) bus 18 and provides timing and control signals to the logic and circuitry of Video Controller (VC) 78.

Referring now to the bit mapped portion of Video Controller (VC) 78, Bitmap Memory 102 stores and provides imagery to be displayed on the Cathode Ray Tube (CRT) screen in bit mapped form. The information to be displayed is written into Bitmap Memory (BM) 102, in bit mapped form, through the data bus connected from the output of Video Controller Data Transceiver (VCDT) 90 and under the control of addresses provided through an address bus connected from an output of Bitmap Memory Address Multiplexer (BMAM) 104. Bitmap Memory Attribute Memory (BMAM) 104 in turn receives write address inputs from the address bus connected from the output of Video Controller Address Buffer (VCAB) 84.

Bitmap Memory Attribute Memory (BMAM) 104 also receives read address inputs from the outputs of X Axis Adderss Generator (XAAG) 106 and Y Address Address Generator (YAAG) 108. The bit mapped imagery information stored in Bitmap Memory (BM) 102 is read from Bitmap Memory (BM) 102 under control of the read addresses provided from XAAG 106 and YAAG 108 and through Bit Mapped Shift Register (BMSR) 110, which performs a parallel to serial conversion, to be combined in Video OR Gate (VORG) 112 with possible image information output from Attribute Logic 98. The output of Video OR Gate (VORG) 112 is then provided as a video output to the Cathode Ray Tube (CRT) driver circuits to result in a corresponding display on the Cathode Ray Tube (CRT) screen.

Detailed control of Bitmap Memory (BM) 102 is provided by Bitmap Memory Control Logic (BMCL) 114, which in turn is provided with control signals from Timing Generator Logic (TGL) 100.

B. Basic Software and Control Structure and Operation (FIG. 3)

Figure 3:
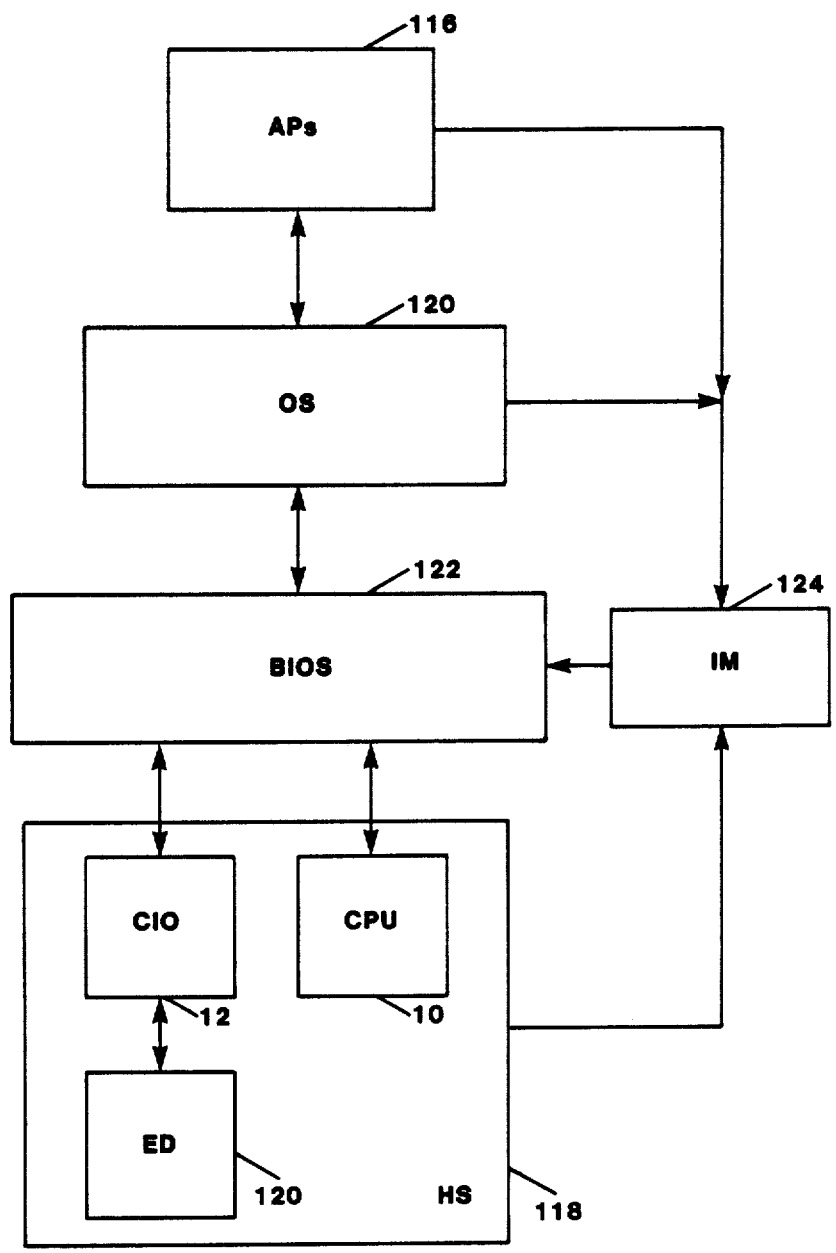
FIG. 3 is a diagrammic representation of the software and control structure of a system as illustrated in FIGS. 1 and 2.

Referring to FIG. 3, a diagrammic representation of an exemplary software and control structure of a computer system of the type described above is shown.

1. Applications Programs, Operating System and Basic Input/Output System (FIG. 3)

As indicated in FIG. 3, the software/control structure of a typical system is multi-leveled. The current applications program(s) (APs) 116 are the highest, most visible level. The system Hardware Structure (HS) 118, including Central Processing Unit (CPU) 10 and Control Input/Output Logic (CIO) 12 and associated External Devices (ED) 120, for example, Cathode Ray Tube (CRTs), keyboards, disc drives, printers and telecommunications devices, is the lowest level.

Interposed between Application Programs (APs) 116 and Hardware Structure (HS) 118 is the Operating System (OS) 120 and the Basic Input/Output System (BIOS) 122. As previously described, an Operating System (OS) 120 essentially supervises, directs and controls the overall operation of the computer system. In addition, Operating System (OS) 120 provides an interface between the Application Programs (APs) 116 being run upon the system and the actual internal structure of the system itself, including Hardware Structure (HS) 118. Essentially, Application Programs (APs) 116 "run on" and "see" Operating System (OS) 120 rather than the actual underlying system structure. In many systems, Operating System (OS) 120, often referred to as the Disc Operating System (DOS), resides in Main Memory (MM) 48 and is loaded therein from, for example, a disc.

As also previously described, the underlying structures of computer systems differ, often widely, as a result of their designer's design choices, intended features and functions, and available implementation technology. To be standardized, an operating system cannot communicate directly to the system hardware but must specify an interface to hardware controlling routines provided by each hardware manufacturer. As a result, a "standard" operating system such as Operating System (OS) 120 generally cannot be run directly upon the system structure.

For this reason, the system control structure further includes, as part of the internal structure of the system, the further level referred to as the Basic Input/Output System (BIOS), that is, Basic Input/Output System (BIOS) 122. Basic Input/Output System (BIOS) 122 is essentially comprised of sequences of routines, that is, programs, which direct and control the functions and operations of the system structure at the lowest and most detailed level and forms an interface between the Operating System (OS) 120 and the system's internal structure. Basic Input/Output System (BIOS) 122 also provides a primary means, described further below, by which the system elements, such as those comprising Hardware Structure (HS) 118, communicate among themselves and with the higher levels of control. In addition, many Basic Input/Output System's (BIOS's) provide additional service routines or features which are not part of the standard operating system and which provide additional functionality to the system or enhance the performance of the system.

Basic Input/Output System (BIOS) 122 may reside in Main Memory (MM) 48, being loaded therein from, for example, a disc, or may reside in a Read Only Memory (ROM) in the same manner as the system initialization routines residing in Erasable-Programmable Read Only Memory (EPROM) 68. In many systems, Basic Input/Output System (BIOS) 122 resides partly in ROM and partly as loadable routines in Main Memory (MM) 48.

2. Interrupt Mechanism (FIG. 3)

The system structure includes a further control and communications element referred to as the Interrupt Mechanism (IM) 124. Interrupt Mechanism (IM) 124 is essentially a mechanism for handling events which occur during execution of a program but which are not usually performed as a direct step in the execution of the program. In the occurrence of such an event, execution of the program is "interrupted", the state of program execution saved, the event handled, and program execution resumed from the point at which it was interrupted.

The two major classes of interrupt are software interrupts, initiated by Application Program (AP) 116 or OS 120 routines, and hardware interrupts, initiated by the operation of the elements comprising Hardware Structure (HS) 118. That is, software interrupts are called by a program when the program wishes to have an operation performed by the operating system or by the system hardware while hardware interrupts are generated when an element of the system hardware requires servicing.

The interrupt routines function upon essentially the same level of detail as the Basic Input/Output System (BIOS) 122 routines and are usually, as in the exemplary system of FIGS. 1 and 2, regarded as part of the routines residing in the Basic Input/Output System (BIOS) 122. Depending upon the specific allotment of functions within Basic Input/Output System (BIOS) 122 and Interrupt Mechanism (IM) 124, however, the interrupt routines may be regarded as comprising a separate set of routines. Again, the interrupt routines may reside in Main Memory (MM) 48 as loadable routines, or in Read Only Memory (ROM), or a combination thereof.

The handling of software interrupts, that is, the calling or initiating of the appropriate software interrupt handling routines, is performed in the same manner as the calling or initiating of Basic Input/Output System (BIOS) 122 routines. That is, an Application Program (AP) 116 or Operating System (OS) 120 routine issues a request or instruction which addresses the appropriate interrupt handling routine stored in Main Memory (MM) 48 or in a Read Only Memory (ROM).

Hardware interrupts, which are generated by Hardware Structure (HS) 118, are initiated through specific logic provided for this purpose and result from the operation of Hardware Structure (HS) 118 elements. In the exemplary system of FIGS. 1 and 2, this mechanism is provided by Programmable Interrupt Controller (PIC) 66 and Nonmaskable Interrupt Logic (NMIL) 36. Essentially, Programmable Interrupt Controller (PIC) 66 and Nonmaskable Interrupt Logic (NMIL) 36 are provided with specific control signal inputs for this purpose from the various elements of Hardware Structure (HS) 118. When the occurrence of an interrupt condition in an Hardware Structure (HS) 118 element is indicated to Programmable Interrupt Controller (PIC) 66 or Nonmaskable Interrupt Logic (NMIL) 36 through such an interrupt input, Programmable Interrupt Controller (PIC) 66 or Nonmaskable Interrupt Logic (NMIL) 36 provides a corresponding request or instruction which addresses a corresponding location in an interrupt vector table residing in memory. The interrupt vector table in turn contains vectors, or addresses, identifying the location of the corresponding interrupt handling routine in memory. A vector read from the table is then used to select and initiate the corresponding interrupt handling routine.

Programmable Interrupt Controller (PIC) 66 and Nonmaskable Interrupt Logic (NMIL) 36 initiate interrupt operations for two types of interrupt conditions. These are, respectively, maskable and non-maskable interrupts wherein non-maskable interrupts are essentially conditions which must be handled immediately while maskable interrupts are interrupt conditions whose handling may, if necessary, be delayed. For example, non-maskable interrupts include parity or data errors occurring in Main Memory (MM) 48 reads and, as described below, the handling of Input/Ouput (IO) operations when the system is operating as an emulator or another system. Maskable interrupts, which are the larger group of interrupt conditions, are handled secondarily to non-maskable interrupts and, within the class, are prioritized, the relative priority of maskable interrupts being determined by the programming of Programmable Interrupt Controller (PIC) 66 as described further below. Maskable interrupts include, for partial example, keystroke inputs, disc Input/Output (IO) completion, printer Input/Output (IO), and serial Input/Output (IO) operations.

Figure 4:
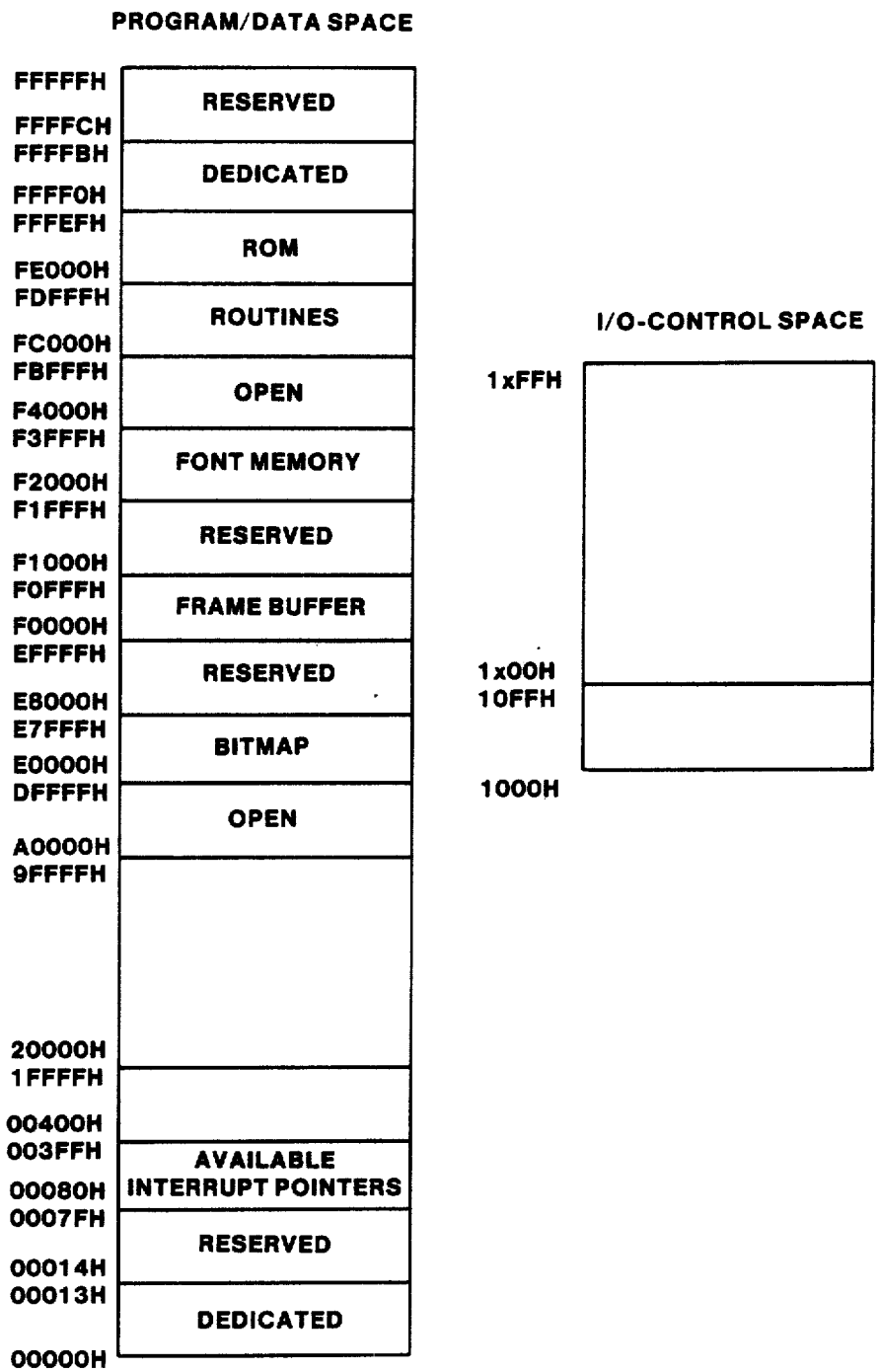
FIG. 4 is a diagrammic representation of the address spaces of the system of FIGS. 1 to 3.

C. System Address Structure (FIG. 4)

The address space of the exemplary system shown in FIGS. 1 to 3 is essentially organized into two address spaces, the first being the general program, routine and data space (Program/Data) and the second being the input/output and system control (Input/Output (IO) - Control) space. Both address spaces are accessed through Buffered Address (BA) bus 40 and Buffered Data (BD) bus 42 and the space addessed is determined by the operation being performed.

The Program/Data space is comprised, in general, of Main Memory (MM) 48, and program Read Only Memories (ROMs), such as Erasable-Programmable Read Only Memory (EPROM) 68. This address space is generally used to store programs and routines, such as Application Programs (APs) 116, Operating System (OS) 120, and Basic Input/Output System (BIOS) 122, including the interrupt routines, and data to be operated upon or resulting from the operation of such programs and routines. Included in this space, as described below, is the memory space residing in Video Controller (VC) 78 for video display Input/Output (IO) functions.

The Input/Output (IO)-Control address space is comprised of registers and memories in the system control and input/output elements. This address space is used, for example, to store and provide information used in system control, for programming certain system control functions, and to transfer information between the system and external elements, for example, a disc drive or the keyboard. As described just above, however, certain Input/Output (IO) functions may reside in the Program/Data space.

As regards system control, it should be noted that many system elements, such as Programmable Interrupt Controller (PIC) 66 or Extended Programmable Communications Interface (EPCI) 74, are individually programmable to perform system operation support functions. The operation of such elements is programmed by addressing and writing appropriate commands and/or data into their internal memory spaces. These elements may in turn store and provide information used in the control of system operation when the memory spaces therein are appropriately accessed. For example, Programmable Interrupt Controller (PIC) 66 may be programmed to determine the relative priorities of system interrupt conditions and to indicate the appropriate interrupt routines to call for each such condition. In turn, information regarding interrupt conditions which have occurred is stored in registers therein and may be accessed by the interrupt handling routines to determine the appropriate action to be taken. Other system control elements, while not programmable, may also store and provide information regarding system operation which may be accessed and used for these purposes.

In the system input/output functions, many elements such as Floppy Disk Controller (FDC) 72, Extended Programmable Communications Interface (EPCI) 74 and Parallel Printer Interface (PPI) 76, may be similarly programmable and, in addition, include registers and memory spaces which comprise the paths by which information is transferred between the system and external elements. For example, Floppy Disk Controller (FDC) 72 contains registers which are used to store and buffer information being transferred between the system and a disc. These registers are addressed through Buffered Address (BA) bus 40 and information to be transferred to or from a disc written into or read from the registers through Buffered Data (BD) bus 42. In further example, Universal Asynchronous Receiver/Transmitter (UART) 70 contains similar registers which are used to buffer and store keystroke information until read by the system.

Referring to FIG. 4, a diagrammic representation of the system address space is shown. The various areas within the address space illustrated therein are delineated by the addresses, in hexidecimal notation, indicated on the left of the diagram. The function of each segment of address space is indicated on the right of the diagram.

In the first, Program/Data Space, for example, address space 00000H through 9FFFFH (H=hexidecimal) is general address space accessible to Central Processing Unit (CPU) 10 and generally residing in Main Memory (MM) 48. Within that space, addresses 0000H to 003FF are reserved and dedicated for, for example, the previously described tables used by Interrupt Memory (IM) 124. Address spaces E0000H to F3FFFH are assigned to video display memory, for example, the display memories residing in Video Controller (VC) 78. In this regard, address space F0000H to F0FFFH corresponds to Character Memory (CM) 80 and Attribute Memory (AM) 82, F2000H to F3FFFH to Font Memory (FM) 94, and E0000H to E7FFFH to Bitmap Memory (BM) 102. Finally, address space FC0000H to FFFFFH is reserved and dedicated to, for example, Erasable-Programmable Read Only Memory (EPROM) 68 and the routines stored therein.

In the second, Input/Output (IO)-Control Space, addresses 1000H to 1FFFH are used for input/output and control functions. Of this address range, the elements shown in FIG. 1 occupy addresses 1000H to 10FFH while addresses 1x00H to 1XFFH, x being equal to or greater than 1, are reserved for additional and optional elements, such as Winchester disc drives.

Having described the structure and operation of a typical system of the "personal" or "professional" computer class, those factors effecting the emulation of one such system by another system will be described next below.

2. System Differences Effecting System Emulation

As previously described, a primary problem in "software portability", that is, the ability to run a program written for a first system upon a second, different system without modification, arises from the practice among applications program developers of "bypassing" the operating system—that is, of including instructions and commands in the applications program which go directly to a system's Basic Input/Output System (BIOS), interrupt mechanism or hardware structure, rather than only to and through the operating system. As a result, and because of the possible differences in internal structure between two such systems, an applications program written for the first system and which provides instructions and commands directly to the first system's internal structure may, when run on the second system, fail to provide the expected result.

The second system may differ, for example, in the structure and operation of its Basic Input/Output System (BIOS), in the mapping or location of programs and routines in its Program/Data address space, in its interrput mechanism, in its Input/Output (IO)-Control Address space, or in its hardware devices. The two systems may use different devices for the same purpose, or may use the same device for different purposes. For example, Parallel Printer Interface (PPI) 76 is used to drive a parallel printer in the Wang Personal Computer (PC), but the same device is used as a keyboard interface device in the IBM Personal Computer (PC). In further example, one system may use a Signetics 2661 Universal Asynchronous Receiver/Transmitter (UART) for serial Input/Output (IO) operations while another may use a National Semiconductor 8250 Universal Asynchronous Receiver/Transmitter (UART), each of which responds to different commands and uses different Input/Output (IO) addresses. In yet further example, two systems may have keyboards which differ in the keys provided and in the hardware code corresponding to the various keys. As previously described, a system's Basic Input/Output System (BIOS) is essentially the bridge between the system's operating system and the system's hardware structure. As such, the Basic Input/Output System's (BIOS's) of two systems may differ accordingly and an instruction or command which is valid with respect to the first system's Basic Input/Output System (BIOS) may be invalid with respect to the second system's Basic Input/Output System (BIOS).

In further example, the organization of the Progam/Data address spaces of two systems may differ such that an applications program written for the first system may attempt to write data or routines into or modify a portion of the second system's Program/Data space which is reserved or dedicated to other functions. By way of example, the Wang Personal Computer (PC) Program/Data space assigned to storing video display information, that is, the memory spaces of Video Controller (VC) 78, differ from the memory space assigned to this function in the IBM Personal Computer (PC). As such, any program written for the IBM Personal Computer (PC) and providing video display outputs which write directly to Video Controller (VC) 78 will fail to run properly on the Wang system, and the reverse.

In yet further example, the interrupt mechanisms of the Wang and IBM Personal Computers (PCs) differ in two respects. First, and as implied above, the interrupt handling routines and tables of the two systems reside in different portions of the two systems address spaces, so that an IBM Personal Computer (PC) application program which makes a direct call to an interrupt routine will, again, fail to execute properly. In further difference, in the Wang Personal Computer (PC) a particular hardware interupt routine may service interupts from multiple devices, with the interrupt mechanism identifying which particular device requires service. In the IBM Personal Computer (PC), each device is provided with an individual interrupt vector, that is, each device is effectively provided with a separate interrupt service routine. In addition, the software interrupt service routines of the two systems may have completely different specifications, that is, may be required to respond to completely different conditions.

In a final example, the addresses or "ports" of the input/output devices of two systems may be mapped into different areas of their Input/Output (IO)-Control address spaces, may be differently organized within their respective spaces, or may service different Input/Output (IO) devices.

Figure 5A:
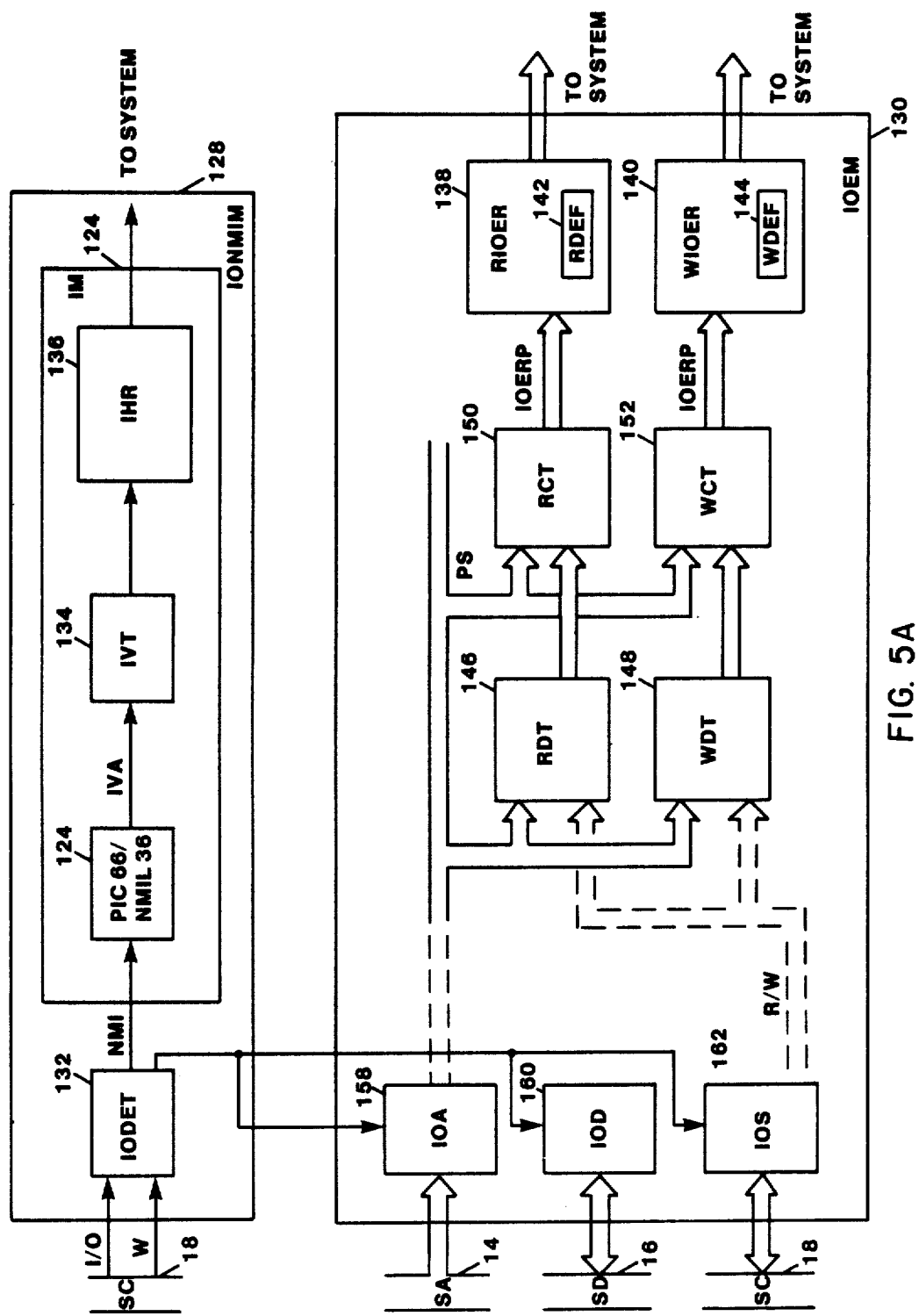
FIGS. 5A and 5B are diagrammic representations of an I/O structure emulation means.
Figure 5B:
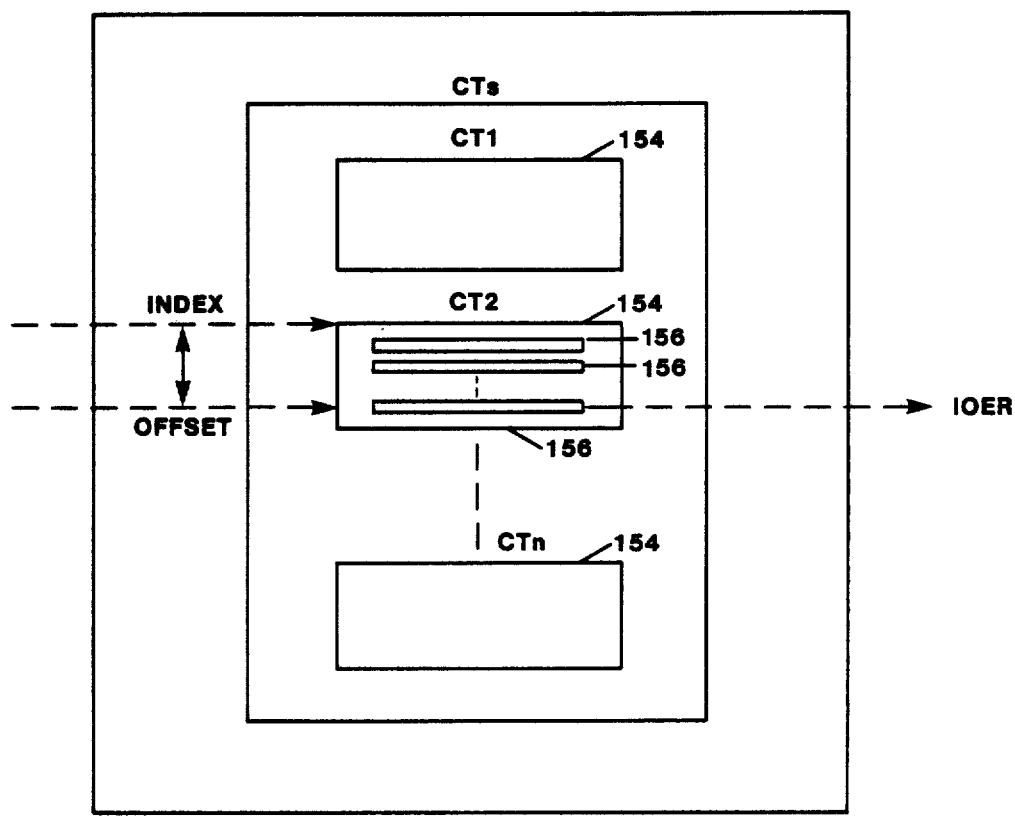
Figure 6:
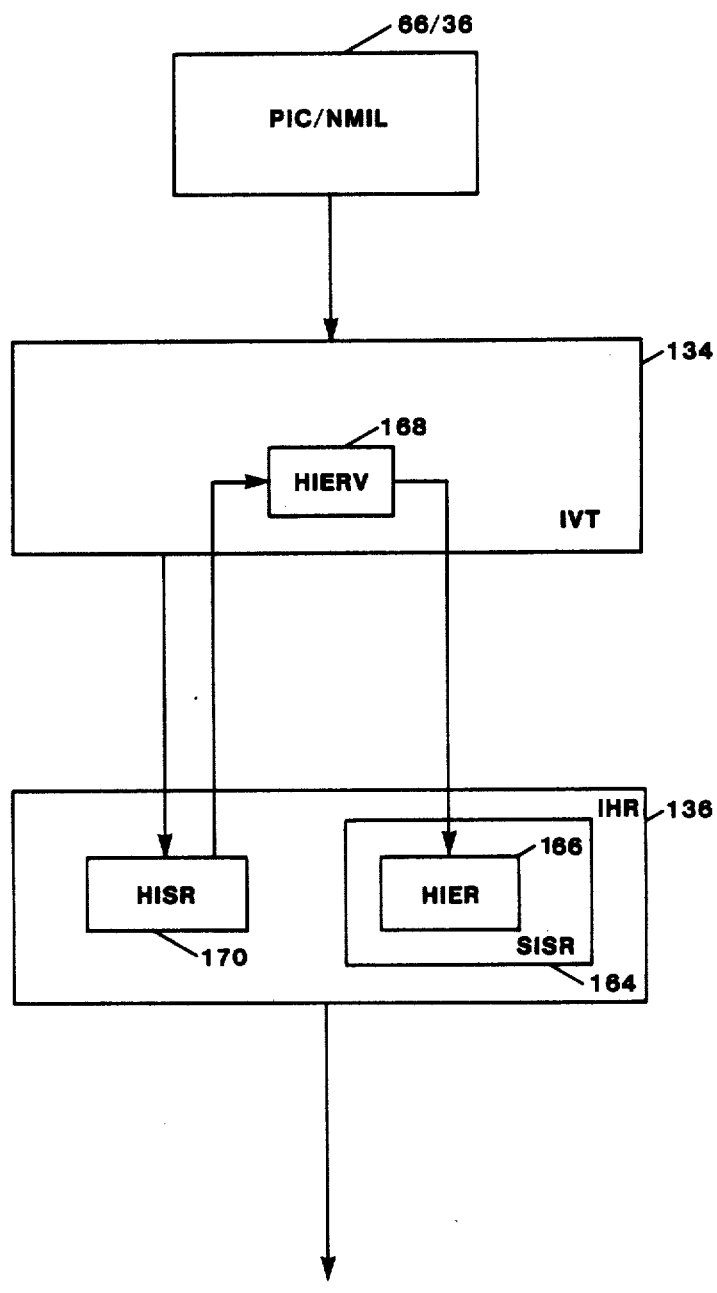
FIG. 6 is a diagrammic representation of a hardware interrupt emulation mechanism.

3. Emulation Of A First System By A Second System (FIGS. 5A, 5B and 6)

The emulation of a first system by a second system in such a manner as to allow programs written for the first system to run on the second system without modification thereby may require emulation of the first system in four aspects. These are the Basic Input/Output System (BIOS), the mapping of Program/Data address space, the interrupt mechanism, and the mapping, structure and functionality of Input/Output (IO)-Control address space.

The function, operation and design of a Basic Input/Output System (BIOS) coupling a particular operating system to the hardware and internal structure of a given system are well known to those of ordinary skill in the art and will not be described in further detail herein. It should be noted that the requirement that a particular Basic Input/Output System (BIOS) emulate another Basic Input/Output System (BIOS) operates as a design constraint on the emulating Basic Input/Output System (BIOS), rather than as a fundamental change in the nature of the emulating Basic Input/Output System (BIOS).

Similarly, the remapping of a system's Program/Data address space to emulate that of another system is well known in the art and can be readily accomplished in many stystems, usually under control of programs written for that purpose. For example, in emulating an IBM Personal Computer (PC) on a Wang Professional Computer, the primary remappings of the Wang system Program/Data space involve the allocation of address spaces for the IBM video display memory and certain reserved address spaces and the relocation of the Wang interrupt tables and routines.

By way of example, Wang system address spaces B0000H to B0FFFH and B1000H to B1FFFH, which are otherwise free, are allocated respectively to contain a Frame Buffer (FB), similar to Character Memory (CM) 80 and Attribute Memory (AM) 82 of Video Controller (VC) 78, and a reserved address space corresponding to such a space in the IBM Personal Computer (PC) system. Video Controller (VC) 78 may thereby receive and provide display data at the addresses expected by programs written for the IBM Personal Computer (PC) system.

As previously described, the Wang system interrupt tables and routines reside in locations 00000H to 003FFH to Wang Program/Data space. Certain of these areas are not, however, protected or reserved in the IBM Personal Computer (PC) system and programs written for the IBM Personal Computer (PC) may write into or otherwise modify this area of the Wang system address space.

Accordingly, certain Wang interrupt vectors, that is, addresses which point to the locations of interrupt handling routines for Wang Personal Computer (PC) hardware functions, are relocated from vector numbers 00080H to 00087H (addresses 200H to 21FH) to vector numbers 00050H to 00057H (addresses 140H to 15FH), which are reserved in the IBM Personal Computer (PC) system. The relocation of these interrupt vectors requires the reprogramming of Programmable Interrupt Controller (PIC) 66 so that Programmable Interrupt Controller (PIC) 66 provides the appropriate new addresses of the relocated vectors in response to the corresponding interrupt conditions. As previously described, Programmable Interrupt Controller (PIC) 66 is a programmable device and may be appropriately reprogrammed for this purpose by the emulation Basic Input/Output System (BIOS) or other software provided for this purpose.

The remaining two areas of system emulation, the mapping, structure and functionality of Input/Output (IO)-Control address space and the interrupt mechanism, are presented in greater detail next below.

1. Input/Output (I/O) Structure Emulation (FIGS. 5A and 5B)

As previously described, the system Input/Output (IO) structure is comprised of the hardware elements and the controlling routines by which information is communicated between the system and external devices, such as disc drives, the video display, the keyboard, and serial and parallel input and output devices. As also previously described, an emulating system and the emulated system may often use different hardware devices to perform similar Input/Output (IO) functions and, even where the devices are similar, those Input/Output (IO) devices which are programmable may be programmed differently. In addition, the Input/Output (IO) device ports may, in the two systems, occupy different locations in their respective Input/Output (IO)-Control address spaces. For example, the Input/Output (IO) ports in the IBM Personal Computer (PC) are located in the address space from 000H to 3FFH while the Input/Output (IO) ports in the Wang Professional Computer are located, as described above, at addresses 1000H to 1FFFH.

As a result, Input/Output (IO) requests generated by programs written for a first system will most probably be invalid when those programs are run on a second system. The second system must thereby emulate the Input/Output (IO) structure of the first system with regard to program generated Input/Output (IO) requests, and will preferable do so without requiring extensive or fundamental modification to its Input/Output (IO) structure.

Referring to FIGS. 5A and 5B, the mechanism by which the present system emulates the Input/Output (IO) structure and functionality of another system is represented. As indicated therein, the mechanism includes Input/Output Nonmaskable Interrupt Mechanism (IONMIM) 128, which in turn includes the system's previously existing Interrupt Mechanism (IM) 124, and Input/Output Emulation Mechanism (IOEM) 130. As described below, Input/Output Nonmaskable Interrupt Mechanism (IONMIM) 128 detects the occurrence of "foreign" Input/Output (IO) requests, that is, Input/Output (IO) requests generated by programs originally written for another system. As described further below, Input/Output (IO) requests outside the address range of 1000H to 1FFFH are considered to be foreign Input/Output (IO) requests. Input/Output Emulation Mechanism (IOEM) 130 provides control routines which direct the present system's Input/Output (IO) structure so as to emulate the Input/Output (IO) structure of the other system.

Considering first the detection of foreign Input/Output (IO) requests, as previously described Central Processing Unit (CPU) 10 includes Input/Output Decode Logic (IODL) 29. Input/Output Decode Logic (IODL) 29 essentially monitors system input/output requests and provides corresponding control signal outputs to System Control (SC) bus 18 indicating, first, whether an Input/Output (IO) request has occurred, and, second, whether the Input/Output (IO) request is to a valid Input/Output (IO) port address location.

Referring now to Input/Output Nonmaskable Interrupt Mechanism (IONMIM) 128, Input/Output Nonmaskable Interrupt Mechanism (IONMIM) 128 includes Input/Output Detect Logic (IODET) 132, which has inputs connected from System Control (SC) bus 18 and, in particular, from the Input/Output Decode Logic (IODL) 29 control outputs described above. Input/Output Detect Logic (IODET) 132 is responsive to these control signals to provide a nonmaskable interrupt (NMI) to the system's Interrupt Mechanism (IM) 124 upon the occurrence of an Input/Output (IO) request which is not to a valid Input/Output (IO) port address in the present system, that is, upon the occurrence of a foreign Input/Output (IO) request. Interrupt Mechanism (IM) 124, as previously described, provides an Interrupt Vector Address (IVA) output which addresses a corresponding location in an Interrupt Vector Table (IVT) 134 containing vectors, or addresses, identifying the locations of corresponding Interrupt Handling Routines (IHR) 136.

When the present system is emulating another system, Interrupt Mechanism (IM) 124's Interrupt Vector Table (IVT) 134 and Interrupt Handling Routines (IHR) 136 are additionally provided with the appropriate vectors and routines for controlling the operation of Input/Output Emulation Mechanism (IOEM) 130, described below. The programming of Interrupt Mechanism (IM) 124 and the creation of the appropriate routines for controlling the subsequent operation of Input/Output Emulation Mechanism (IOEM) 130 will be apparent to one of odinary skill in the art after the following description of operation of Input/Output Emulation Mechanism (IOEM) 130.

The Input/Output (IO) emulation routines, as described above, reside in and are provided to the system by Input/Output Emulation Mechanism (IOEM) 130 and are structured into two groups according to the type of operation to be performed. The first group is comprised of read operation emulation routines and resides in Read Input/Output Emulation Routines (RIOER) 138 while the second group is comprised of write operation emulation routines and resides in Write Input/Output Emulation Routines (WIOER) 140. As previously described with reference to Interrupt Handling Routine (IHR) 136, Read Input/Output Emulation Routines (RIOER) 138 and Write Input/Output Emulation Routines (WIOER) 140 will generally reside in a portion of the system Program/Data space, either in memory as loaded code or in Read Only Memory (ROM).

It should be noted that, as indicated in FIG. 5A, the Input/Output (IO) emulation routines residing in Read Input/Output Emulation Routines (RIOER) 138 and Write Input/Output Emulation Routines (WIOER) 140 include respectively a Read Default routine (RDEF) 142 and a Write Default Routine (WDEF) 144. These routines are provided for the occurrence certain foreign Input/Output (IO) operations which may not be supported by the emulation routines provided in Read Input/Output Emulation Routines (RIOER) 138 and Write Input/Output Emulation Routines (WIOER) 140. Such requests are usually rarely seen, but do not occur in certain applications programs. In such cases, Read Default routine (RDEF) 142 and Write Default Routine (WDEF) 144 essentially terminate the unsupported requests without further action and in such a manner that system operation is not undesirably disrupted.

Within each type of operation to be emulated, that is, read or write, the operations to be performed are organized into "classes" of operations, for example, having similar characteristics, and the routines residing in Read Input/Output Emulation Routines (RIOER) 144 and Write Input/Output Emulation Routines (WIOER) 146 are generally organized in this manner. The selection of a particular Read Input/Output Emulation Routines (RIOER) 144 or Write Input/Output Emulation Routines (WIOER) 146 routine for emulating a particular foreign Input/Output (IO) operation thereby requires the identification of the type of operation, the class of operation within that type, and the identification of the particular corresponding routine within that class.

The selection of Input/Output (IO) emulation routines from Read Input/Output Emulation Routines (RIOER) 138 and Write Input/Output Emulation Routines (WIOER) 140 in response to a foreign Input/Output (IO) request is, as described above, controlled by routines residing in IHR 136. The actual selection of routines is performed through the mechanism comprised of Read and Write Dispatch Tables (RDT) 146 and (WDT) 148 and corresponding Read and Write Class Tables (RCT) 150 and (WCT) 152 under control of the routines provided by Interrupt Handling Routines (IHR) 136. Read Dispatch Table (RDT) 146 and Read Class Table (RCT) 150 are used to select read operation routines from those residing in Read Input/Output Emulation Routines (RIOER) 138 while Write Dispatch Table (WDT) 148 and Write Class Tables (WCT) 152 are used to select write operations from those residing in Write Input/Output Emulation Routines (WIOER) 140.

As described below, Read Class Table (RCT) 150 and Write Class Table (WCT) 152 contain, respectively, Read and Write Input/Output (Emulation Routine Pointers (RIOERPs and WIOERPs), or addresses, identifying the locations of and selecting the individual emulation routines residing in Read Input/Output Emulation Routines (RIOER) 138 and Write Input/Output Emulation Routine (WIOER) 140. As indicated in FIG. 5B, which is a diagrammic representation of the internal structures of Read Class Table (RCT) 156 and Write Class Table (WCT) 158, the pointers residing in Read Class Table (RCT) 156 and Write Class Table (WCT) 158 are structured into Classes 154 corresponding to the class groupings of emulation routines in Read Input/Output Emulation Routines (RIOER) 138 and Write Input/Output Emulation Routine (WIOER) 140. Each Class 154 contains the pointers, Input/Output Emulation Routines (IOERs) 156, identifying the locations of the individual corresponding emulation routines in Read Input/Output Emulation Routines (RIOER) 156, identifying the locations of the individual corresponding emulation routines in Read Input/Output Emulation Routines (RIOER) 138 and Write Input/Output Emulation Routine (WIOER) 140.

The pointers residing in Read Class Table (RCT) 150 and Write Class Table (WCT) 152 are, in turn, located and selected by address inputs provided, in part, from Read Dispatch Table (RDT) 152 and Write Dispatch Table (WDT) 154 and, in part, from certain Input/Output Emulation (IOEM) 130 registers latching and storing information pertaining to foreign Input/Output (IO) operation requests. As will be described below, the addresses stored in and provided by Read Dispatch Table (RCT) 146 and Write Dispatch Table (WDT) 148 to, respectively, Read Class Table (RCT) 150 and Write Class Table (WCT) 152, are used as index addresses to select, within Read Class Table (RCT) 150 or Write Class Table (WCT) 152, the particular Classes 154 containing the Input/Output Emulation Routines (IOERs) pointing to the appropriate emulation routines in Read Input/Output Emulation Routines (RIOER) 138 and Write Input/Output Emulation Routines (WIOER) 140. The latched information pertaining to the foreign Input/Output (IO) request is used, in part, to address Read Dispatch Table (RDT) 146 and Write Dispatch Table (WDT) 148 to select the appropriate indexes stored therein to be provided to Read Class Table (RCT) 150 or Write Class Table (WCT) 152 and, in part, as an address offset input to Read Class Table (RCT) 150 and Write Class Table (WCT) 152 to select the individual Input/Output Emulation Routines (IOERs) within the corresponding Classes 154 selected by the index addresses provided by Read Dispatch Table (RDT) 146 or Write Dispatch Table (WDT) 148.

Referring to the Input/Output Emulation (IOEM) 130 registers for latching and storing information pertaining to foreign Input/Output (IO) requests, Input/Output Emulation (IOEM) 130 includes Input/Output Address Register (IOA) 158 interconnected from System Address (SA) bus 14, Input/Output Data Register (IOD) 160 interconnected from System Data (SD) bus 16, and Input/Output Status Register (IOS) 162 interconnected from System Control (SC) bus 18. Upon the initiation of a foreign Input/Output (IO) request, the Nonmaskable Interrupt (NMI) output of Input/Output Detect Logic (IODET) 132 selects and initiates, as described above, the Interrupt Handling Routines (IHR) 136 Input/Output (IO) emulation routine for directing the operation of Input/Output Emulation (IOEM) 130 and concurrently latches certain information pertaining to the request into Input/Output Address Register (IOA) 158, Input/Output Data Register (IOD) 160 and Input/Output Status Register (IOS) 162. In particular, the requested foreign Input/Output (IO) address is latched into Input/Output Address Register (IOA) 158 and, if the request is for an Input/Output (IO) write operation, the data to be written is latched into Input/Output Data Register (IOD) 160. The status information latched into Input/Output Status Register (IOS) 162 includes the fact of occurrence of the request, whether the request was for a read or write, whether it was for a byte or word Input/Output (IO) access, and, if for a word, whether the address was at an odd address.

In response to a foreign Input/Output (IO) operation interrupt, the system performs an interrupt state save operation as previously described with reference to the system Interrupt Mechanism (IM) 124. The resulting Input/Output (IO) emulation control routine provided from Interrupt Handling Routines (IHR) 136 then reads the Input/Output (IO) request address information from Input/Output Address Register (IOA) 158 and status information from Input/Output Status Register (IOS) 162. The status information identifying whether the requested operation is a read or write and a first part of the address information read from Input/Output Address Register (IOA) 158 are used as an address input to Read Dispatch Table (RDT) 146 and Write Dispatch Table (WDT) 148 to obtain the index identifying, in Read Class Table (RCT) 150 or Write Class Table (WCT) 152, the Class 154 containing the Input/Output Emulation Routine Pointer (IOERP) to the appropriate corresponding emulation routine residing in Read Input/Output Emulation Routines (RIOER) 138 or Write Input/Output Emulation Routines (WIOER) 140. In this respect, the read/write status information portion of the address into Read Dispatch Table (RDT) 146 and Write Dispatch Table (WDT) 148 selects whether the corresponding index lies in the Read Dispatch Table (RDT) 146 or Write Dispatch Table (WDT) 148 range of addresses.

The index read from Read Dispatch Table (RDT) 146 or Write Dispatch Table (WDT) 148 is then used as a first part of an address into, respectively, Read Class Table (RCT) 150 or Write Class Table (WCT) 152 to select the Class 54 containing the Input/Output Emulation Routine Pointer (IOERP) to the emulation routine to be executed. The second part of the address into Read Class Table (RCT) 150 or Write Class Table (WCT) 152 is, as described above, comprised of a second part of the address information read from Input/Output Address Register (IOA) 158. This portion of the Read Class Table (RCT) 150 Write Class Table (WCT) 152 address input is effectively used as an offset (Offset), relative to the index input, to select within the Class 154 selected by the index portion of the address the location of the Input/Output Emulation Routine Pointer (IOERP) to the emulation routine.

The selected Input/Output Emulation Routine Pointer (IOERP) is then used by the Input/Output (IO) emulation control routine provided from Interrupt Handling Routines (IHR) 136 to select and initiate the appropriate emulation routine from those residing in Read Input/Output Emulation Routines (RIOER) 138 or Write Input/Output Emulation Routines (WIOER) 140. The emulation routine may then, in turn, access the status information residing in Input/Output Status Register (IOS) 162 as required to appropriately emulate the requested foreign Input/Output (IO) operation. If the requested operation was for a data write, the selected emulation routine will read and transfer the data latched into Input/Output Data Register (IOD) 160 appropriately.

Having described the means by which the present system emulates the Input/Output (IO) structure of another system, the means by which the present sytem emulates the interrupt structure of that other system will be described next below.

2. Interrupt Mechanism Emulation (FIG. 6)

As previously described, there are two classes of interrupt operations in a system of the type described herein, software interrupts and hardware interrupts. Software interupts are initiated by Application Program (AP) 116 or Operating System (OS) 120 routines, and hardware interrupts are initiated by the operation of the hardware elements comprising Hardware Structure (HS) 118. Examples of hardware interrupts include: keyboard inputs initiated from the keyboard, serial and parallel port Input/Output (IO) operations, disc operations and timed sequences. The routines Interrupt Handling Routines (IHR) 136 for handling interrupt operations function upon essentially the same level of detail as the Basic Input/Output System (BIOS) 122 routines and are usually, as in the exemplary system of FIGS. 1 and 2 represented in FIG. 5A, regarded as part of the routine residing in the Basic Input/Output System (BIOS) 122.

The handling of software interrupts, that is, the calling or initiating of the appropriate software interrupt handling routines, is performed in the same manner as the calling or initiating of Basic Input/Output System (BIOS) 122 routines. That is, an Application Program (AP) 116 or Operating System (OS) 120 routine issues a request or instruction which addresses the appropriate interrupt handling routine stored in Main Memory (MM) 48 or in a Read Only Memory (ROM). The emulation of the software interrupt operation of another system is thereby a matter of adding the appropriate interrupt handing routines to the Basic Input/Output System (BIOS) emulating the other system, as described previously.

Hardware interrupts, which are called by Hardware Structure (HS) 118, are initiated through specific logic provided for this purpose and result from the operation of Hardware Structure (HS) 118 elements. In the exemplary system of FIGS. 1 and 2 and FIG. 5A, this mechanism is provided by programmable Interrupt Controller (PIC) 66 and Nonmaskable Interrupt Logic (NMIL) 36. Essentially, Programmable Interrupt Controller (PIC)

66 and Nonmaskable Interrupt Logic (NMIL) 36 are provided with specific control signal inputs for this purpose from the various elements of Hardware Structure (HS) 118. When the occurrence of an interrupt condition in an Hardware Structure (HS) 118 element is indicated to Programmable Interrupt Controller (PIC) 66 or Nonmaskable Interrupt Logic (NMIL) 36 through such an interrupt input, Programmable Interrupt Controller (PIC) 66 or Nonmaskable Interrupt Logic (NMIL) 36 provides a corresponding interrupt vector address (IVA) which addresses a corresponding location in an interrupt vector table (IVT) 134. Interrupt Vector Table (IVT) 134 in turn contains and provides vectors, or addresses, identifying the location of the corresponding interrupt handling routines in Interrupt Handling Routines (IHR) 136.

As previously described, the internal hardware structure and operation of two system may differ widely and, as a result, so may the operations of the system hardware interrupt mechanisms. Accordingly, an applications program written for one system and which directly communicates with that systems interrupt mechanism will most probably fail to run correctly on another system. By way of example, a particular applications program may require the user to enter certain information by means of the keyboard and may expect the hardware interrupt routines handling keyboard input interrupts to present the information in a particular manner.

As described above, the emulation of a second system's software interrupt mechanism by a first system can be performed by the first system's Basic Input/Output System (BIOS) which emulates the second system and is a process well understood by those or ordinary skill in the art. The emulation of a second system's hardware interrupt mechanism by a first system, however, is similar in problems to that of emulating the second system's Input/Output (IO) structure.

Referring to FIG. 6, a diagrammic representation of the means by which the present system emulates the hardware interrupt mechanism of a second system is shown. Indicated therein is the hardware interrupt mechanism of the present system, including Programmable Interrupt Controller (PIC) 66 and Nonmaskable Interrupt Logic (NMIL) 36, Interrupt Vector Table (IVT) 134 and Interrupt Handling Routines (IHR) 136, the operation of which has been previously described.

In the hardware interrupt emulation mechanism of the present system, Interrupt Handling Routines (IHR) 136 contains, in its software interrupt service routines (SISR's) 164, an additional group of Hardware Interrupt Emulation Routines (HIER's) 166 which emulate the operation of the hardware interrupt mechanism of the second system. Interrupt Vector Table (IVT) 134 correspondingly contains additional Hardware Interrupt Emulation Routine Vectors (HIERV's) 168 to Hardware Interrupt Emulation Routines (HIER's) 166 and the Hardware Interrupt Services Routines (HISR's) 170 of Interrupt Handling Routines (IHR) 136 are altered to include references to Hardware Interrupt Emulation Roine Vector (HIERV's) 166.

Hardware Interrupt Emulation Routines (HIER's) 166, Hardware Interrupt Emulation Routine Vectors (HIERV's) 168 and the altered Hardware Interrupt Services Routines (HISR's) 170 are enabled when the system is emulating the second system. The generation of a hardware interrupt in the system thereby results in the corresponding Hardware Interrupt Service Routine (HISR) 170 calling, through the corresponding Hardware Interrupt Emulation Routine Vector (HIERV) 168, the corresponding Hardware Interrupt Service Routine (HIER) 166 residing in Software Interrupt Service Routine (SISR) 164. Hardware Interrupt Service Routines (HIER's) 166, Hardware Interrupt Emulation Routine Vectors (HIERV's) 168 and the altered Hardware Interrupt Service Routines (HISR's) 170 thereby effectively perform hardware interrupt operations in the same manner as software interrupt operations, described above.

It should be noted that Hardware Interrupt Service Routine (HIER) 164 is not limited to purely emulation routines, but may further include or be replaced by other routines providing additional functionality or enhanced performance. Again, the design and operation of hardware interrupt emulation routines is similar to that of software interrupt routines and, being well understood by those of ordinary skill in the art, will not be discussed in further detail herein.

It will be apparent to those of ordinary skill in the art that the present invention may be embodied in yet other specific forms without departing from the spirit of essential characteristics thereof. Thus, the present embodiments are to be considered in all respects as illustrative and not restrictive, the scope of the invention being indicated by the appended claims rather than be the foregoing description, and all changes which come within the meaning and range of equivalency of the claims are therefore intended to be embraced.

What is claimed is:

1. In a data processing system including means for storing programs, CPU means responsive to the programs for processing the data, input/output devices, an input/output structure responsive to the programs for communicating information between the system and the external devices and an interrupt means responsive to operation of the system for interrupting the execution of a current operation in response to an interrupt request and executing an interrupt operation to service the interrupt request, wherein the input/output structure of the system has ports to the input/output devices which occupy a first range of the system address space and the programs include requests for input/output operations directed to the ports in the first range of the system address space, emulation means for allowing the execution of programs written for another system by emulating the input/output structure of the other system wherein the input/output devices of the other system have ports located within a second range of address space and the programs written for the other system include requests for input/output operations directed to ports in in the second range of the address space, the emulation means comprising:

input/output request detection means responsive to the input/ouput requests, means for storing routines for directing operation of the system input/output structure in a manner as to emulate operation of the input/output structure of the other system, emulation interrupt means for detecting foreign input/output requests that includes means responsive to the input/output request detection means for detecting requests not normally recognized by the system input/output structure and providing corresponding non-maskable interrupts, means responsive to the non-maskable interrupts and to the corresponding foreign input/output requests for selecting and initiating corresponding input/output emulation routines, means responsive to the non-maskable interrupts for storing information pertaining to the foreign input/output requests, the means for selecting and initiating emulation routines being further responsive to the stored input/output request information in selecting the corresponding input/output emulation routines.

2. The emulation means of claim 1, wherein:

the request detection means includes means for comparing input/output request port addresses to the range of port addresses occupied by the system input/output devices and indicating when a port address is within the range of address space occupied by the system input/output devices, and the emulation interrupt means for detecting foreign input/output requests includes means responsive to the operation of the request detection means for detecting the occurrence of input/output requests not accompanied by corresponding indications of port addresses within the range of address space occupied by the system input/output devices and providing corresponding non-maskable interrupts upon occurrence of each such input/output request.

3. The emulation means of claim 2, wherein the means for storing request information includes first register means for storing port addresses of foreign input/output requests, and second register means for storing status information pertaining to foreign input/output requests, including an indication whether a foreign input/output request is for a read or a write operation.

4. The emulation means of claim 3, wherein:

the status information further includes an indication whether a foreign input/output request is for a byte or word access.

5. The emulation means of claim 3, wherein the means for storing further includes:

third register means for storing the data to be written when an input/output request is for a write operation.

6. The emulation means of claim 1, wherein the means for selecting and initiating input/output emulation routines comprises:

class table means for storing addresses for emulation routines stored in the routine storing means, the emulation routine addresses stored in in the class table means being structured into classes, each class containing the addresses of a corresponding group of foreign input/output operations, and dispatch table means for storing index addresses, each index address corresponding to a group of emulation routines and identifying the location in the class table means of the corresponding class of emulation routine addresses, the dispach table means being responsive to a first portion of each foreign input/output request for providing a corresponding index address of the corresponding class of addresses stored in the class table means, and the class table means responsive to a second portion of each foreign input/output request and to the corresponding index address for providing a corresponding emulation routine address to select and initiate execution of the corresponding emultion routine address.

7. The emulation means of claim 6, wherein each foreign input/output request includes a port address identifying the location of a corresponding input/output device within the address space of the other system and corresponding to the type of input/output operation requested, and the means for storing request information includes first register means for storing port addresses of foreign input/output requests, and the first portion of a foreign input/output request is a first portion of the request port address, and the second portion of a foreign input/output request is a second portion of the request port address.

8. The emulation means of claim 7, wherein the means for storing request information further includes second register means for storing status information pertaining to foreign input/output requests, including an indication whether a foreign input/output request is for a read or a write operation, and the index means is further responsive to the status information identifying whether a request is for a read or write operation in providing the corresponding index address.

9. The emulation means of claim 8, wherein the emulation routines are structured into a set of read operation routines and a set of write operation routines, each set containing, respectively, the groups of routines for emulating foreign read and write input/output operations, and the dispatch and class table means are comprised of a read dispatch table and corresponding read class table and a write dispatch table and corresponding write class table.

10. The emulation means of claim 1, wherein the emulation routines further include:

default routines corresponding to foreign input/output requests not having corresponding emulation routines, each default routine treminating the corresponding input/output request operation, and the means for selecting and initiating input/output emulating routines being responsive to requests not having corresponding emulation routines for selecting and executing a corresponding default routine.

11. The emulation means of claim 1, wherein the emulation interrupt means includes first interrupt means responsive to interrupt requests provided by the programs directing operation of the system for providing corresponding first interrupt routines for directing corresponding first interrupt handling operations of the system, and second interrupt means responsive to interrupt requests provided by the hardware elements of the system for providing corresponding second interrupt routines for directing corresponding second interrupt handling operations of the system, the emulation interrupt means further including means for emulating the corresponding second interrupt means of the other system, comprising:

means in the first interrupt means for storing interrupt emulation routines for directing operation of the system in a manner as to emulate operation of the corresponding second interrupt means of the other system, and means responsive to operation of the second interrupt means for selecting and initiating corresponding input/output emulation routines.

* * * * *